(12) United States Patent
Maria

(10) Patent No.: US 12,225,132 B2
(45) Date of Patent: *Feb. 11, 2025

(54) CYBERSECURITY GUARD FOR CORE NETWORK ELEMENTS

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,432

(22) Filed: Apr. 12, 2023

(65) Prior Publication Data

US 2023/0254146 A1 Aug. 10, 2023

Related U.S. Application Data

(63) Continuation of application No. 16/391,944, filed on Apr. 23, 2019, now Pat. No. 11,658,821.

(51) Int. Cl.
| | | |
|---|---|---|
| *H04L 9/32* | (2006.01) | |
| *G06F 9/455* | (2018.01) | |
| *G06F 16/245* | (2019.01) | |
| *H04W 48/16* | (2009.01) | |

(52) U.S. Cl.
CPC .......... *H04L 9/321* (2013.01); *G06F 9/45558* (2013.01); *G06F 16/245* (2019.01); *H04W 48/16* (2013.01); *G06F 2009/45587* (2013.01); *G06F 2009/45595* (2013.01)

(58) Field of Classification Search
CPC ... H04L 9/321; G06F 16/245; G06F 9/45558; H04W 48/16
See application file for complete search history.

(56) References Cited

U.S. PATENT DOCUMENTS

| | | | |
|---|---|---|---|
| 10,979,410 B1 | 4/2021 | Byrd | |
| 11,026,084 B2* | 6/2021 | Kang | ............... H04W 12/0433 |
| 11,172,358 B2 | 11/2021 | Maria | |
| 11,658,821 B2* | 5/2023 | Maria | ................... H04L 63/126 |
| | | | 713/155 |
| 2013/0085880 A1 | 4/2013 | Roth et al. | |
| 2016/0134419 A1* | 5/2016 | Smith | ................... H04L 9/0833 |
| | | | 380/30 |
| 2016/0275461 A1 | 9/2016 | Sprague et al. | |
| 2017/0236123 A1 | 8/2017 | Ali et al. | |
| 2017/0250972 A1 | 8/2017 | Ronda et al. | |
| 2018/0254905 A1 | 9/2018 | Chun | |

\* cited by examiner

*Primary Examiner* — Oleg Korsak
(74) *Attorney, Agent, or Firm* — Guntin & Gust, PLC; John G. Rauch

(57) ABSTRACT

When a network element attempts to establish a session with another network element, a security verification agent may be activated in one or both network elements. The security verification agents, such as front-end processors, virtual network functions, or other software agents, may reside in each of the network elements.

20 Claims, 7 Drawing Sheets

CYBERSECURITY GUARD FOR CORE NETWORK ELEMENTS

CROSS REFERENCE TO RELATED APPLICATIONS

This application is a continuation of U.S. patent application Ser. No. 16/391,944 filed on Apr. 23, 2019. All sections of the aforementioned application are incorporated herein by reference in their entirety.

BACKGROUND

In computers and computer networks an attack is any attempt to expose, alter, disable, destroy, steal, or gain unauthorized access to or make unauthorized use of an asset. A cyberattack is any type of offensive maneuver that targets computer information systems, infrastructures, computer networks, or personal computer devices. An attacker is a person or process that attempts to access data, functions or other restricted areas of the system without authorization, potentially with malicious intent. Depending on context, cyberattacks can be part of cyberwarfare or cyberterrorism. A cyberattack can be employed by nation-states, individuals, groups, society, or organizations. A cyberattack may originate from an anonymous source.

With the increasing demand from consumers and businesses for faster Internet access along with a decreasing cost of computers and an expansion of technology around the world, threats of cyber-attacks are on the rise. This disclosure is directed to addressing issues in the existing technology.

SUMMARY

Disclosed herein is subject matter that may address issues with cybersecurity threats, such as advance persistent threats (APT), for core network elements.

In an example, an apparatus may include a processor and a memory coupled with the processor that effectuates operations. The operations may include obtaining, by a second core network element, a control plane request from a first core network element; based on the control plane request, pausing processing of the control plane request on the second core network element; and activating a security agent of the second core network element to generate a query for a security verification. The operations further comprising: sending the query for the security verification to a security verification device; and responsive to sending the query, receiving an alert message from the security verification device that indicates the validation status of the first network element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Disclosed herein is subject matter that may address issues with cybersecurity threats, such as advance persistent threats (APT), for core network elements. APTs are malicious programs or functions that are inserted by bad actors into computing devices. These threats may persist over a long period of time without being detected.

The disclosed capability is termed the EPC guard. It may operate as follows. When a network element attempts to establish a session with another EPC network element the EPC Guard may be activated in one or both network elements. The EPC guard agents (e.g., front end processors, virtual network functions, or other software agents) may reside in each of the network elements, such as the MME, HSS, EPCG, SGW, PGW, etc.

The EPC Guard agents in the network element being requested may query a master EPC guard (MEG). The MEG compares the number forwarded by the network element requesting service to a numerical hash value (or another cryptographic value) stored in the MEG database. In an example, if the numbers compare accurately, then no changes to the image of the requesting element have been performed and the request is allowed to go through. If the numbers do not compare, then the system has the option of rejecting the request, or alerting a security incident and event management (SIEM) platform of the possibility of cybersecurity threat in the EPC core network. The value of having an EPC guard system may include ensuring the integrity of EPC carrier operations by detecting cybersecurity threats in the carrier core.

Figure 1:
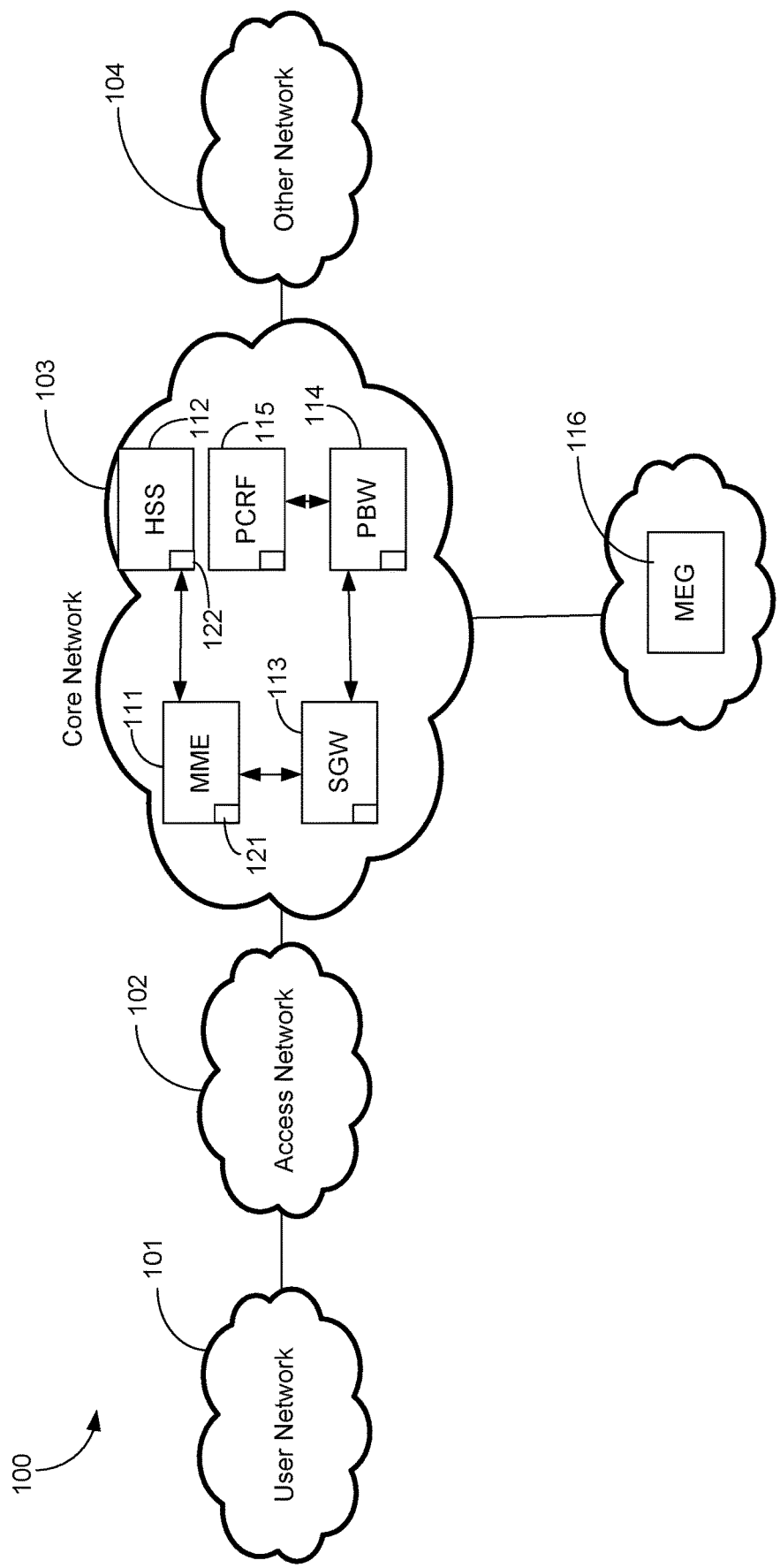
FIG. 1 illustrates an exemplary network that may incorporate an evolved packet core (EPC) guard for core network elements.

FIG. 1 illustrates an exemplary network 100 that may incorporate an evolved packet core (EPC) guard for core network elements. Although the term EPC guard is used it is contemplated that the disclosed subject matter may apply 5G or the like wireless systems and may be generally referred to as core network guard. User network 101 may be communicatively connected with access network 102. User network 101 may include user equipment (e.g., mobile devices), routers, switches, or other customer premise equipment. Access network 102 may include gateway routers, gateway switches, or base stations (e.g., eNodeBs or gNodeBs), among other things. Access network 102 may be communicatively connected with core network 103. Core network 103 may include devices such as a mobility management entity (MME) 111, a home subscriber server (HSS) 112, serving gateway (SGW) 113, packet data network gateway (PGW) 114, policy or charging rules function (PCRF) 115, or the like. Each network element may include an EPC guard agent, such as EPC guard agent 121 of MME 111 or EPC guard agent 122 of HSS 112. The network elements of core network 103 may be communicatively connected as shown and further connected with a master EPC guard (MEG) 116. Core network 103 may be communicatively connected with one or more other networks 104.

Figure 2:
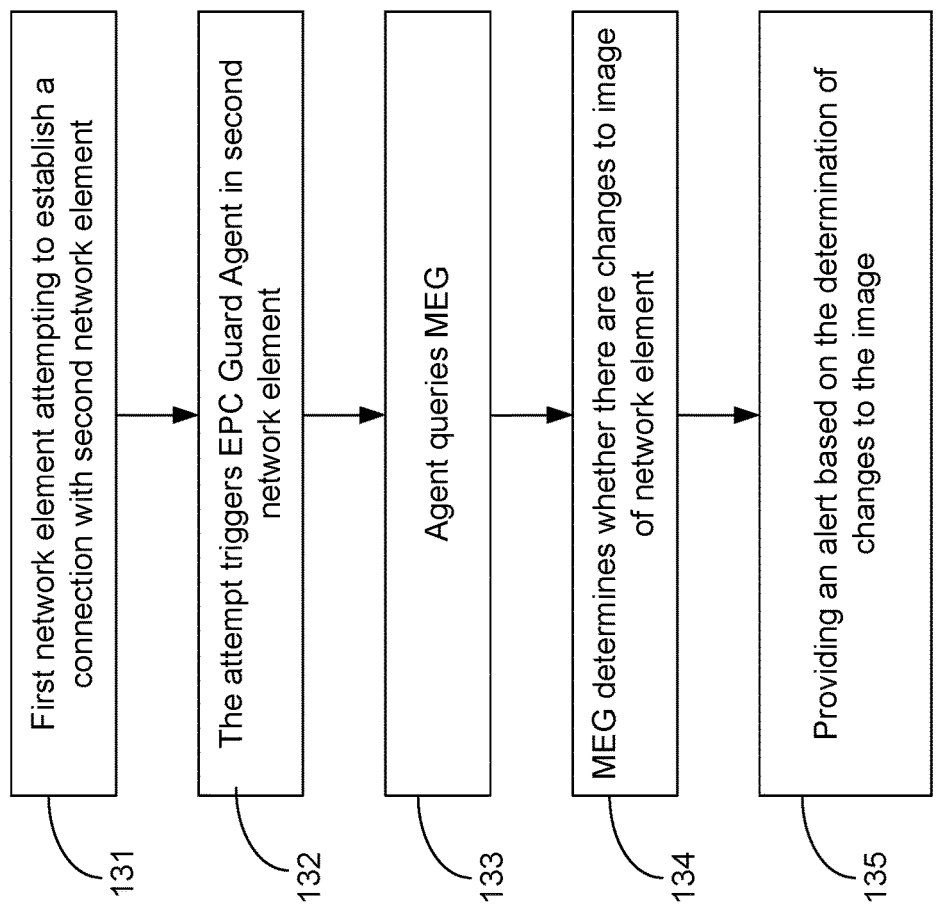
FIG. 2 illustrates an exemplary method that may incorporate an EPC guard for core network elements.

FIG. 2 illustrates an exemplary method that may incorporate an EPC guard for core network elements. At step 131, MME 111 (e.g., a first network element) may attempt to establish a session or issue a request to HSS 112 (e.g., a second network element). For example, MME 111 may issue an SS7 request to HSS 112, which may be a request for an authentication vector. At step 132, based on the request of step 131, EPC guard agent 121 or EPC guard agent 122 may be activated. In a first scenario, when HSS 112 receives the request of step 131 it may not fully process the request and activate EPC guard agent 122. EPC guard agent may be activated based on the type of request, the source of the request, or other factors. In an example, if the source of the request is from a trusted network (e.g., a network that has been cleared of threats within a day or other period) then EPC guard agent 122 may not be activated. Another example may be an MME owned by an external or foreign carrier asking for an authentication vector for a user who is roaming. In these cases, the EPC guard 122 may ask for additional security measures, such as the cryptographic number. In another example, EPC guard agent 122 may be activated based on a type of request, such as a request associated with control signaling of core network elements. Here it is contemplated, when EPC guard agent 122 is activated, a query message (also referred to as query) may be generated. A query may be a request for a policy control parameter from the PCRF network element. Another query may be a request to the Location Based Services (LBS) network element.

At step 133, based on step 132, EPC guard agent 122 may send the query to MEG 116. At step 134, MEG 116 determines whether there are changes to the image of MME 111. MEG 116 may be considered a repository of cryptographically generated numbers associated with each network element. These cryptographic values may be generated when a network element is originally introduced in the network. The cryptographic values are generated via numerical hashes, cryptographic algorithms such as advanced encryption standard (AES), or the like. The cryptographic values may represent the unmodified state of the network element. When a query is obtained by MEG 116, it may fetch the cryptographic value of MME 111. MEG 116 compares the number associated with MME 111 forwarded by EPC guard agent 122 with a numerical hash value (or another cryptographic value) stored in MEG 116. The number is a cryptographic value that represents the true or unmodified state of the network element. When the network element gets an authorized software upgrade or the like, there may be a change control mechanism for authorized software upgrades. The change control would involve changing the cryptographic value of the network element.

At step 135, based the determination of step 134, an alert is provided. If the numbers of step 134 appropriately match, then it may be determined that no changes to the image of the requesting element have been performed and an alert may be sent to HSS 112 to allow for normal processing of the request of step 131 from MME 111. In this example, the request for an HSS authentication vector supporting subscriber authentication is provided. If the numbers of step 134 do not appropriately match, then it may be determined that changes to the image of the requesting element has been performed an alert may be sent to HSS 112 to reject the request of step 131 from MME 111, indicate a threat (e.g., advanced persistent threat) for MME 111, or shutdown MME 111, while rerouting communications through another MME, among other things.

Figure 3:
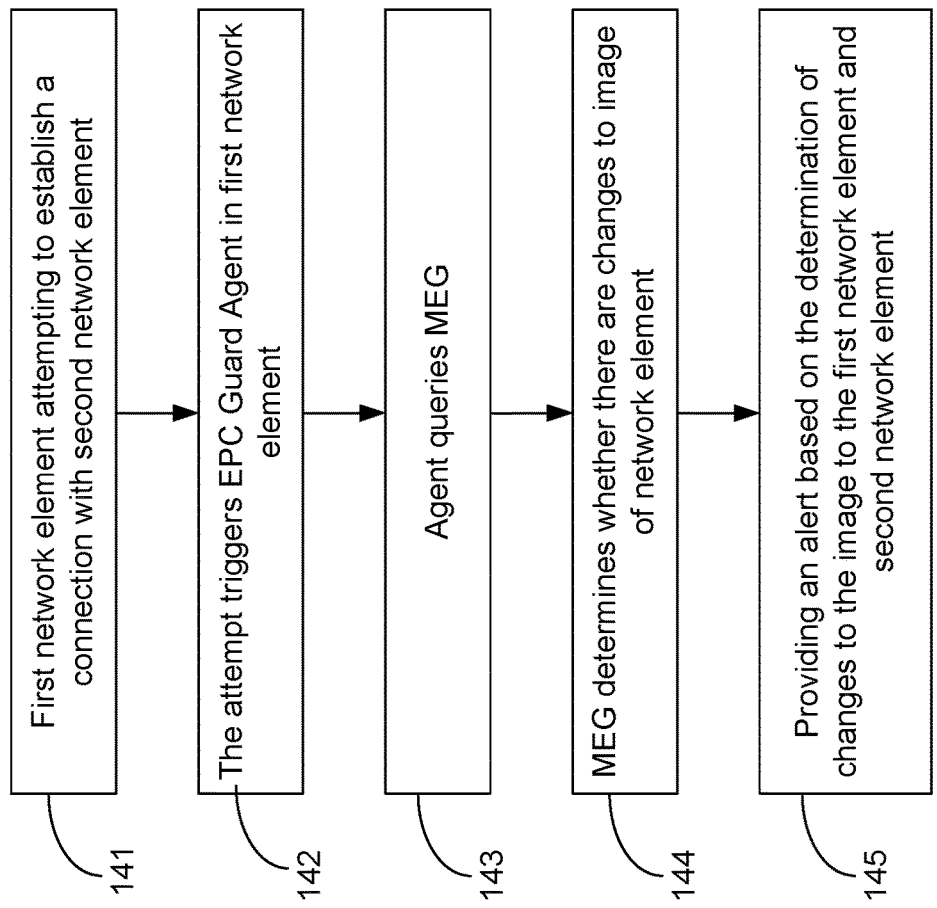
FIG. 3 illustrates another exemplary method that may incorporate an EPC guard for core network elements.

FIG. 3 illustrates another exemplary method that may incorporate an EPC guard for core network elements. At step 141, MME 111 (e.g., a first network element) may attempt to establish a session or issue a request to HSS 112 (e.g., a second network element). For example, MME 111 may issue an SS7 request to HSS 112, which may be a request for an authentication vector. At step 142, based on the request of step 141, EPC guard agent 121 or EPC guard agent 122 may be activated. In a second scenario, when MME 111 generates the request to HSS 112, EPC guard agent 121 may also generate a query to MEG 116. The query may be to check the image of MME 111 and HSS 112. Simultaneously or before the request of step 141 is sent to HSS 112, EPC guard 121 may be activated to generate a query (step 142) and send the query to MEG 116 (step 143). This may help to proactively check the image for HSS 112 when communicating back with MME 111 and further expedite the check of MME 111 for HSS 112. The query of this step may provide cryptographical information of MME 111 and also provide just an indication to activate EPC guard 122 to provide its own query. It is contemplated that measures should be taken to appropriately wall off EPC guard 121 from operations of the network elements. EPC guard 121 may be a virtual machine, a separate device, virtual network function, or the like. EPC guard agent 121, for the method of FIG. 3, may be activated based on the type of request, the source of the request, or other factors. Factors may include the number of users supported by a network element, the time of day, whether there is above average data traffic, connections, or transactions associated with a network element, whether there is below average data traffic, connections, or transactions associated with a network element, quality service level of the service, or number of dropped packets to or from a network element, among other things.

At step 143, based on step 142, EPC guard agent 121 may send the query to MEG 116. At step 144, MEG 116 determines whether there are changes to the image of MME 111. When a query is obtained by MEG 116, it may fetch the cryptographic value of MME 111. MEG 116 compares the number associated with MME 111 forwarded by EPC guard agent 121 or EPC guard agent 122 with a numerical hash value (or another cryptographic value) stored in MEG 116.

At step 145, based the determination of step 144, an alert is provided. If the numbers of step 144 appropriately match, then it may be determined that no changes to the image of the requesting element have been performed and an alert may be sent to HSS 112 to allow for normal processing of the request of step 141 from MME 111. In addition, an alert may be sent to MME 111 to allow for normal processing of subsequent related requests associated with step 141 from HSS 112. If the numbers of step 144 do not appropriately match, then it may be determined that changes to the image of the requesting element has been performed an alert may be sent to MME 111 or HSS 112 to reject communications associated with step 141, indicate a threat (e.g., advanced persistent threat) for MME 111 or HSS 112, or shutdown MME 111 or HSS 112, while rerouting communications through another MME or HSS, among other things.

The disclosed methods of FIG. 2 and FIG. 3 mention specific network elements, but it is contemplated herein that the method may be applied to any number of network elements which may be in the core network 103, access network 102, or other network 104, among others. It is further contemplated that core network elements should implement additional security measures based on the general growth of cyber attacks and cyber warfare.

Network elements which form the Evolved Packet Core (EPC) or carrier networks usually do not have internal validation of the integrity of their software. In other words, there are no functions that validate whether or not the software in a network element has been changed by a malicious actor. When software is changed in an EPC core network element such as an MME, HSS, SGW, PGW, etc., without knowledge or authorization from the vendor or the carrier, malicious code may have been inserted. Malicious actors, such as state sponsored hackers, may insert programmatic changes (APTs) that may go undetected for a long period (e.g., months or years) before their presence is noticed. The lack of detection of APTs in the EPC core is particularly concerning when malicious actors execute data collection or modification actions on sensitive network elements such as the HSS which is the repository of subscriber information or Communications Assistance for Law Enforcement Act (CALEA) network elements where sensitive information is forwarded to law enforcement agencies.

The EPC guard agents may take several forms: hardware front end processors, virtual machines, Virtual Network Functions, software elements imbedded in the network operation system are several variations possible.

It is further contemplated herein that blockchain may be used to validate elements. In an example, in a 5G environment may have millions user plane network elements in which there is a need to ensure that they are the correct ones (e.g., have the authorized images). Through the use of logs and blockchain the changes may be kept track of and validate the integrity of network elements. MEG 116 may be considered a repository that houses the hash values or block chain records. For additional perspective, blockchain provides a cryptographic ledger. A blockchain contains a cryptographic hash value. The blockchain implemented may include a cryptographic representation of the previous state of the network element In addition, the blockchain may include a hash value of the modified network element. Every time a network element is modified, a new hash value is created, and a new block is written in the chain as a log of a timestamp and the new hash value. Thus, the blockchain contains a series of cryptographic values representing the state of the machine very time that it was modified. The cryptographic blocks point backward and forward to each other block and the blockchain creates a cryptographic ledger that cannot be modified.

Note that a session may involve multiple requests. A session may also require a "login" to a network element as opposed to issuing a request. It may not be practical to establish a session when there may potentially thousands of one time short lived requests to a network element. An example of a request may be a message from a control plane MME to a control plane HSS requesting an authentication vector. An example of a session may be a network element attempting to establish a session with an IMS Network Element such as Voice over LTE or VOLTE services.

Also note that in 5G network elements may be considered "images" that are stored in containers. In other words, they may be considered not "real" machines but rather virtual network functions (VNFs). These VNFs are in essence virtual machines. However, in 5G traditional VMs are not used. Rather, for efficiency purposes, images are used to represent VNFs. These images may be moved in and out of worker machines who conduct the real work processed. The images are stored in containers. Containers may be considered programs which provide the work environment so images can be moved in an out for execution in worker nodes The process of creating "worker nodes" and moving images in and out of containers residing in worker nodes is called "orchestration".

Disclosed herein is a mechanism is envisioned so potentially thousands or eventually millions of virtual network elements have a cryptographic method of validation to ensure that malicious actors do not tamper with these VNFs. Service providers don't want foreign malicious actors modifying network functions that reside on customer premises or carrier control networks. If they are successful in modifying these functions, then carrier integrity is compromised. In previous networks, this was more difficult because carriers had "real machines" that needed to be accessed and internal networks with limited exposure to the Internet. This is less true in 5G. There will be thousands or eventually millions of VNFs that are exposed to the Internet and malicious attacks.

Figure 4:
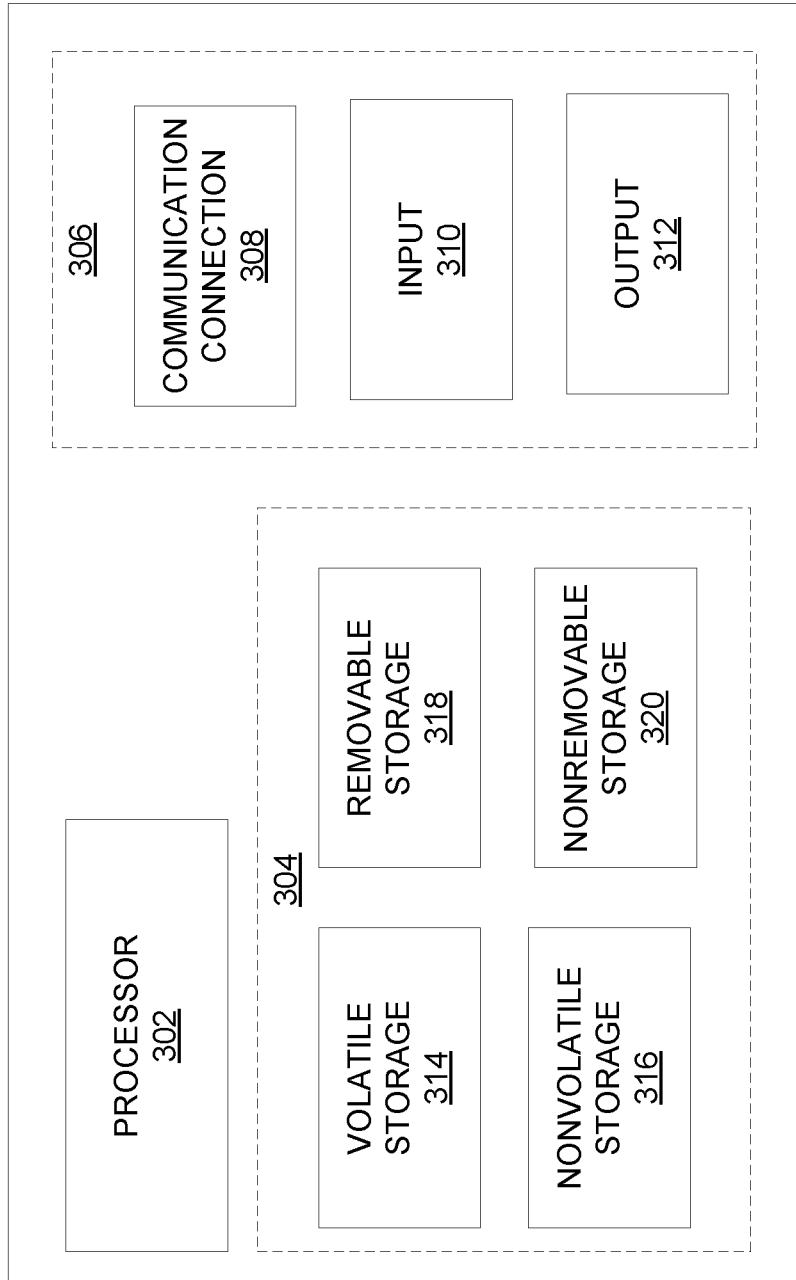
FIG. 4 illustrates a schematic of an exemplary network device.

FIG. 4 is a block diagram of network device 300 that may be connected to or comprise a component of system 100 of FIG. 1. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
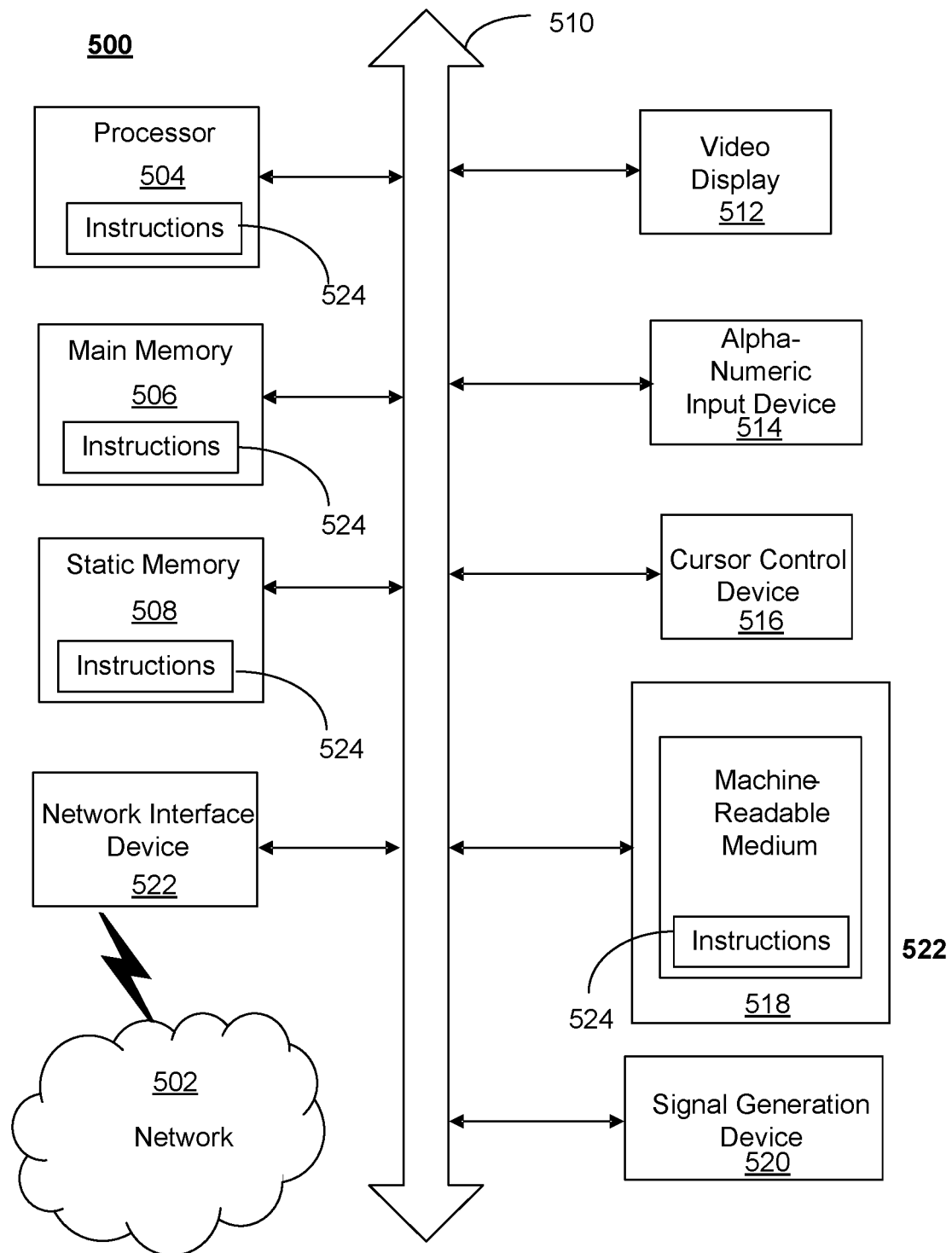
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE, eNB, MME 111, SGW 113, HSS 112, PCRF 115, PGW 114 and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6A:
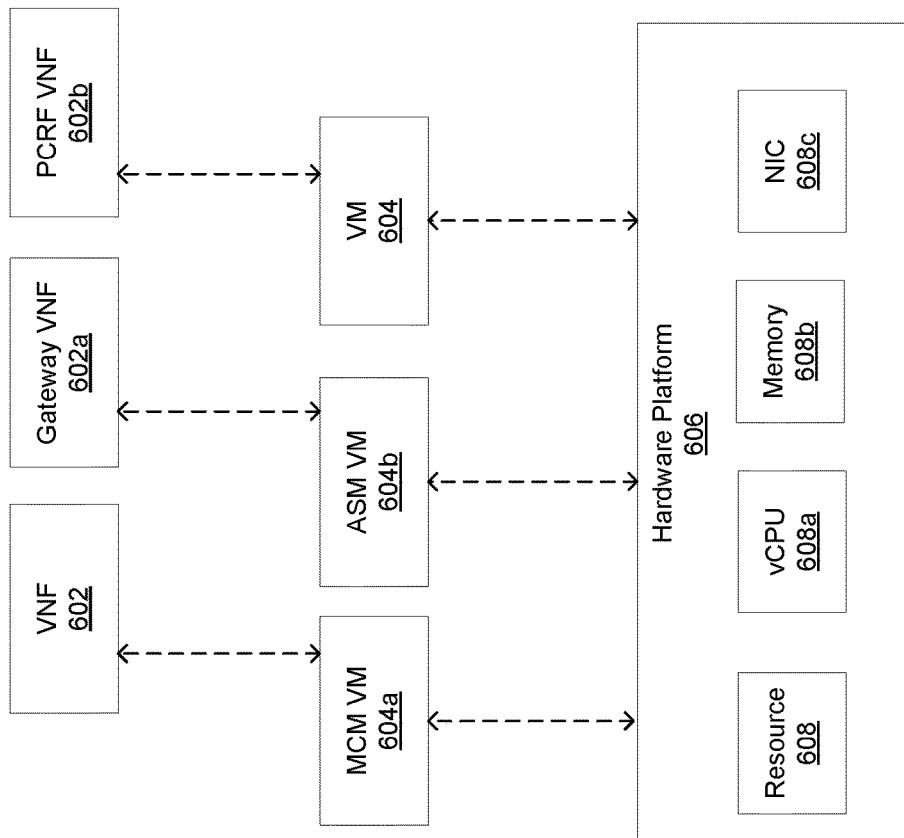
FIG. 6A is a representation of an exemplary network.

FIG. 6A is a representation of an exemplary network 600. Network 600 (e.g., network 100) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 6A illustrates a gateway VNF 602a and a policy and charging rules function (PCRF) VNF 602*b*. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 6A illustrates a management control module (MCM) VM 604*a*, an advanced services module (ASM) VM 604*b*, and a DEP VM 604*c*. Additionally or alternatively, VMs 604 may include other types of VMs. Each VM 604 may consume various network resources from a hardware platform 606, such as a resource 608, a virtual central processing unit (vCPU) 608*a*, memory 608*b*, or a network interface card (NIC) 608*c*. Additionally or alternatively, hardware platform 606 may include other types of resources 608.

Figure 6B:
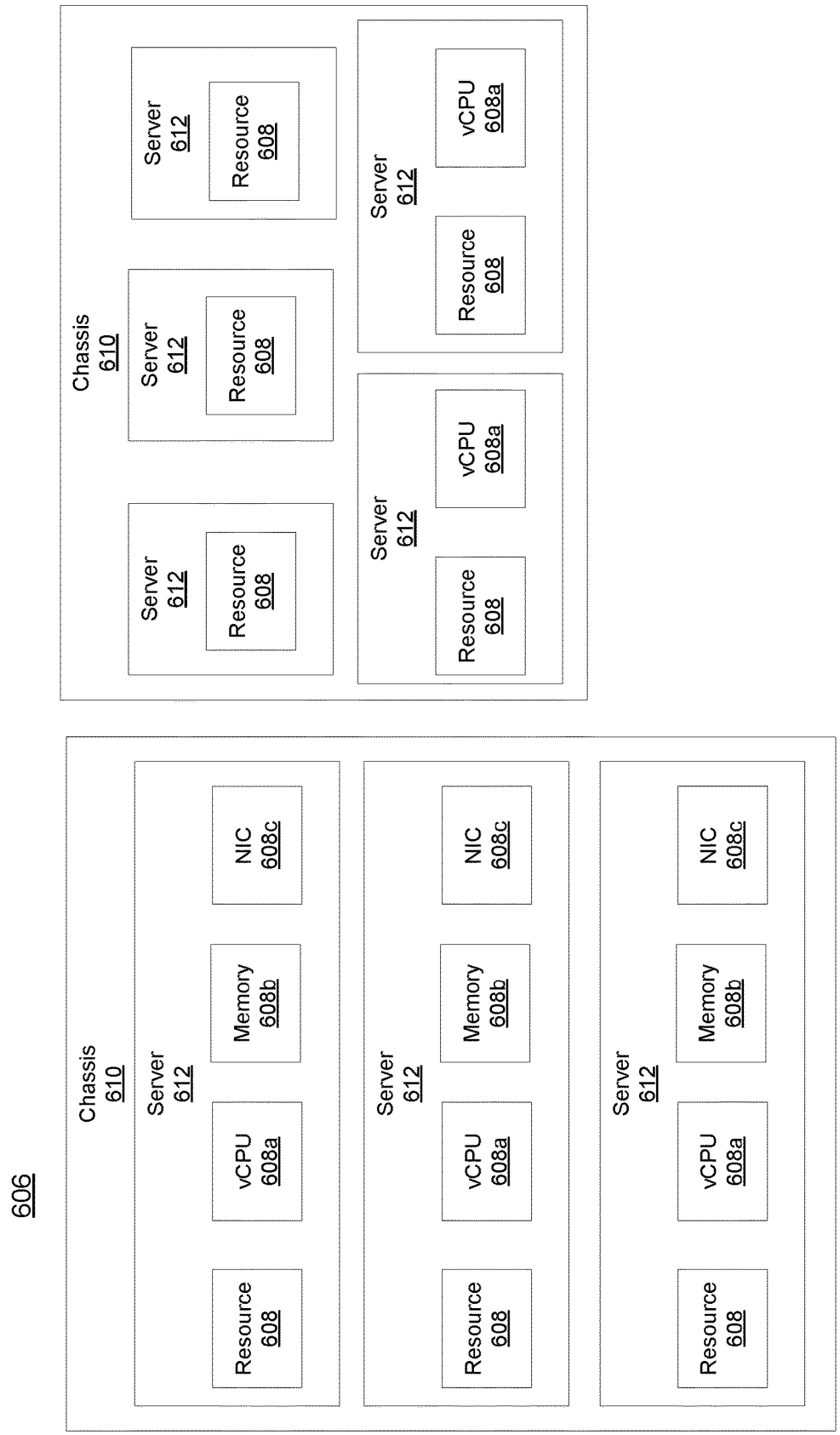
FIG. 6B is a representation of an exemplary hardware platform for a network.

While FIG. 6A illustrates resources 608 as collectively contained in hardware platform 606, the configuration of hardware platform 606 may isolate, for example, certain memory 608*c* from other memory 608*c*. FIG. 6B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 6B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608*a*, 1 GB of memory 608*b*, and 2 NICs 608*c*, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604*a*, an affinity rule may dictate that those six MCM VMs 604*a* be instantiated on the same server 612 (or chassis 610). As another example, if VNF 602 uses MCM VMs 604*a*, ASM VMs 604*b*, and a third type of VMs 604, an affinity rule may dictate that at least the MCM VMs 604*a* and the ASM VMs 604*b* be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604*a* be instantiated on a particular server 612 that does not contain any ASM VMs 604*b*. As another example, an anti-affinity rule may require that MCM VMs 604*a* for a first VNF 602 be instantiated on a different server 612 (or chassis 610) than MCM VMs 604*a* for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602*a* and PCRF VNF 602*b*. Gateway VNF 602*a* may require five VMs 604 instantiated on the same server 612, and PCRF VNF 602*b* may require two VMs 604 instantiated on the same server 612. (Assume, for this example, that no affinity or anti-affinity rules restrict whether VMs 604 for PCRF VNF 602*b* may or must be instantiated on the same or different server 612 than VMs 604 for gateway VNF 602*a*.) In this example, each of two servers 612 may have sufficient resources 608 to support 10 VMs 604. To implement sessions using these two servers 612, first server 612 may be instantiated with 10 VMs 604 to support two instantiations of gateway VNF 602*a*, and second server 612 may be instantiated with 9 VMs: five VMs 604 to support one instantiation of gateway VNF 602*a* and four VMs 604 to support two instantiations of PCRF VNF 602*b*. This may leave the remaining resources 608 that could have supported the tenth VM 604 on second server 612 unused (and unusable for an instantiation of either a gateway VNF 602*a* or a PCRF VNF 602*b*). Alternatively, first server 612 may be instantiated with 10 VMs 604 for two instantiations of gateway VNF 602*a* and second server 612 may be instantiated with 10 VMs 604 for five instantiations of PCRF VNF 602*b*, using all available resources 608 to maximize the number of VMs 604 instantiated.

Consider, further, how many sessions each gateway VNF 602*a* and each PCRF VNF 602*b* may support. This may factor into which assignment of resources 608 is more efficient. For example, consider if each gateway VNF 602*a* supports two million sessions, and if each PCRF VNF 602*b* supports three million sessions. For the first configuration—three total gateway VNFs 602*a* (which satisfy the gateway requirement for six million sessions) and two total PCRF VNFs 602*b* (which satisfy the PCRF requirement for six million sessions)—would support a total of six million sessions. For the second configuration—two total gateway VNFs 602*a* (which satisfy the gateway requirement for four million sessions) and five total PCRF VNFs 602*b* (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which cybersecurity guard for core network elements can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made, to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—cybersecurity guard for core network elements—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method comprising:
responsive to a control plane request associated with a first core network element:
pausing processing of the control plane request by a second core network element while performing a security verification; and
activating, by the second core network element, a security agent to generate a query for the security verification; and
determining, by the second core network element, a validation status of the first core network element via a security verification device according to the query for the security verification, wherein the query includes a current value associated with the first core network element, and wherein the security verification device compares the current value with a second value representing an unmodified state of the first core network element.

2. The method of claim 1, further comprising obtaining, by the second core network element, the control plane request from the first core network element.

3. The method of claim 1, further comprising sending, by the second core network element, the query for the security verification to the security verification device.

4. The method of claim 1, further comprising receiving, by the second core network element, an alert message from the security verification device.

5. The method of claim 4, wherein the alert message further indicates the validation status of the second core network element.

6. The method of claim 4, wherein the alert message indicates that the first core network element is valid, and further comprising resuming processing of the control plane request by the second core network element.

7. The method of claim 4, wherein the alert message indicates that the first core network element is not valid, and further comprising rejecting further processing of the control plane request by the second core network element.

8. The method of claim 1, wherein the security verification device includes a repository of cryptographically generated numbers, and wherein the repository includes, as the second value representing the unmodified state of the first core network element, a predetermined cryptographically generated number for the first core network element.

9. The method of claim 1, wherein the security verification device further determines the validation status of the first core network element based on comparing a cryptographic number of the query to a predetermined cryptographically generated number for the second core network element.

10. The method of claim 1, wherein performance of the steps of pausing processing and activating the security agent are further conditioned on a quality service level of a service associated with the control plane request.

11. A non-transitory computer readable storage medium storing computer executable instructions that when executed by a processing system including a processor cause the processing system to perform operations comprising:
responsive to a control plane request associated with a first core network element:
pausing processing of the control plane request by a second core network element while performing a security verification; and
activating a security agent of the second core network element to generate a query for the security verification; and
determining a validation status of the first core network element via a security verification device according to the query for the security verification, wherein the security verification device compares a current value associated with the first core network element with a second value representing an unmodified state of the first core network element.

12. The non-transitory computer readable storage medium of claim 11, wherein the query includes a current value associated with the first core network element.

13. The non-transitory computer readable storage medium of claim 11, wherein the operations further comprise obtaining the control plane request from the first core network element.

14. The non-transitory computer readable storage medium of claim 11, wherein the operations further comprise sending the query for the security verification to the security verification device.

15. The non-transitory computer readable storage medium of claim 11, wherein the operations further comprise receiving an alert message from the security verification device, wherein the alert message indicates that the first core network element is valid, and wherein the operations further comprise resuming processing of the control plane request by the second core network element.

16. The non-transitory computer readable storage medium of claim 11, wherein the operations further comprise receiving an alert message from the security verification device, wherein the alert message indicates that the first core network element is not valid, and wherein the operations further comprise rejecting further processing of the control plane request by the second core network element.

17. The non-transitory computer readable storage medium of claim 11, wherein the security verification device further determines the validation status of the first core network element based on comparing a cryptographic number of the query to a predetermined cryptographically generated number for the second core network element.

18. A device, comprising:
a processing system including a processor; and
a memory that stores executable instructions that, when executed by the processing system, facilitate performance of operations, the operations comprising:
responsive to a control plane request associated with a first core network element:
pausing processing of the control plane request by a second core network element while performing a security verification; and
activating a security agent of the second core network element to generate a query for the security verification; and
determining a validation status of the first core network element from a security verification device according to the query for the security verification, a current value associated with the first core network element, and a second value representing an unmodified state of the first core network element.

19. The device of claim 18, wherein the security verification device compares the current value associated with the first core network element with the second value representing an unmodified state of the first core network element.

20. The device of claim 18, wherein the operations further comprise receiving an alert message from the security verification device, wherein the alert message indicates the validation status of the first core network element, wherein the operations further comprise resuming processing of the control plane request by the second core network element if the validation status is valid, and wherein the operations further comprise rejecting further processing of the control plane request by the second core network element if the validation status is not valid.

* * * * *